Patented Aug. 15, 1933

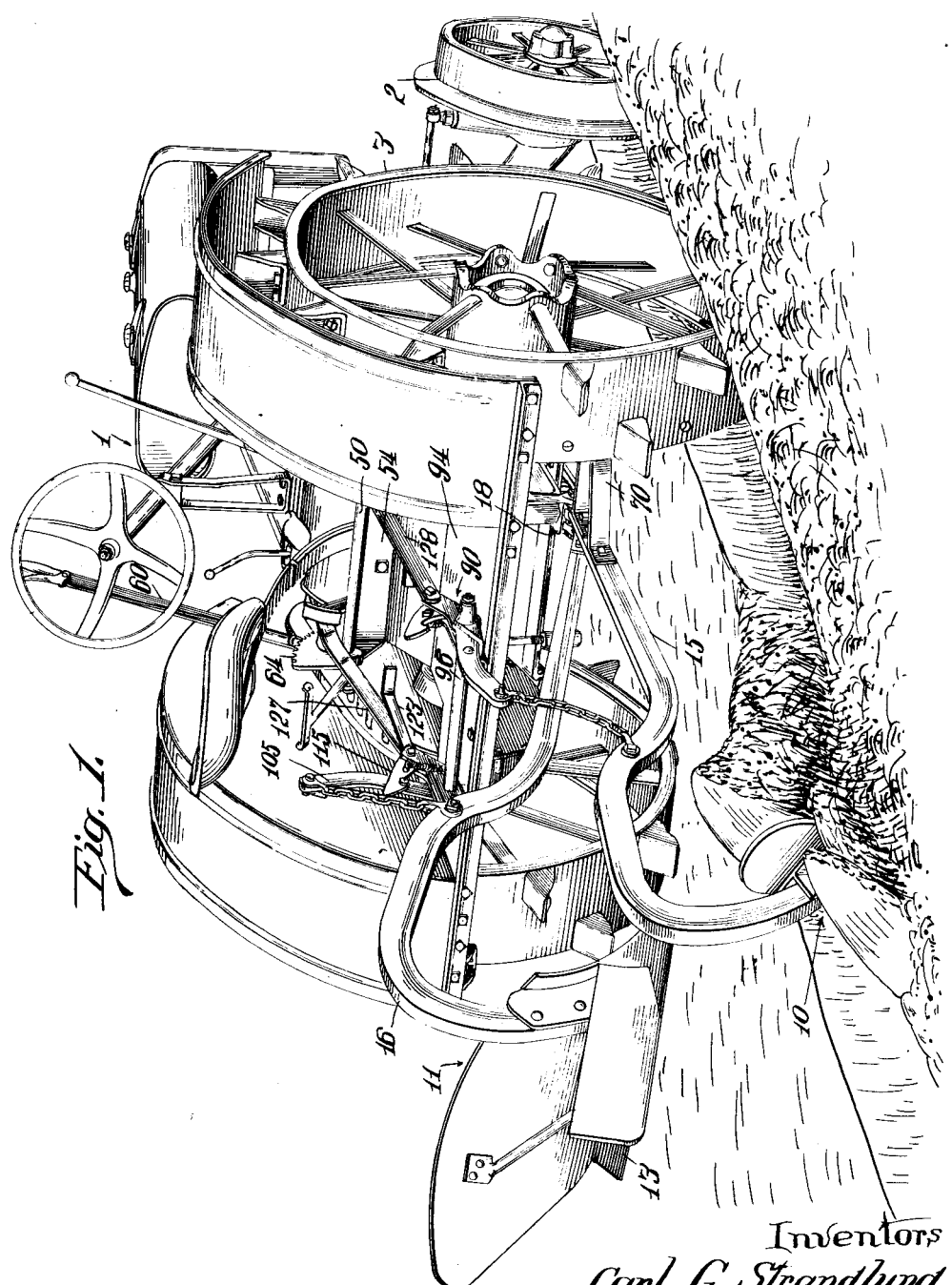

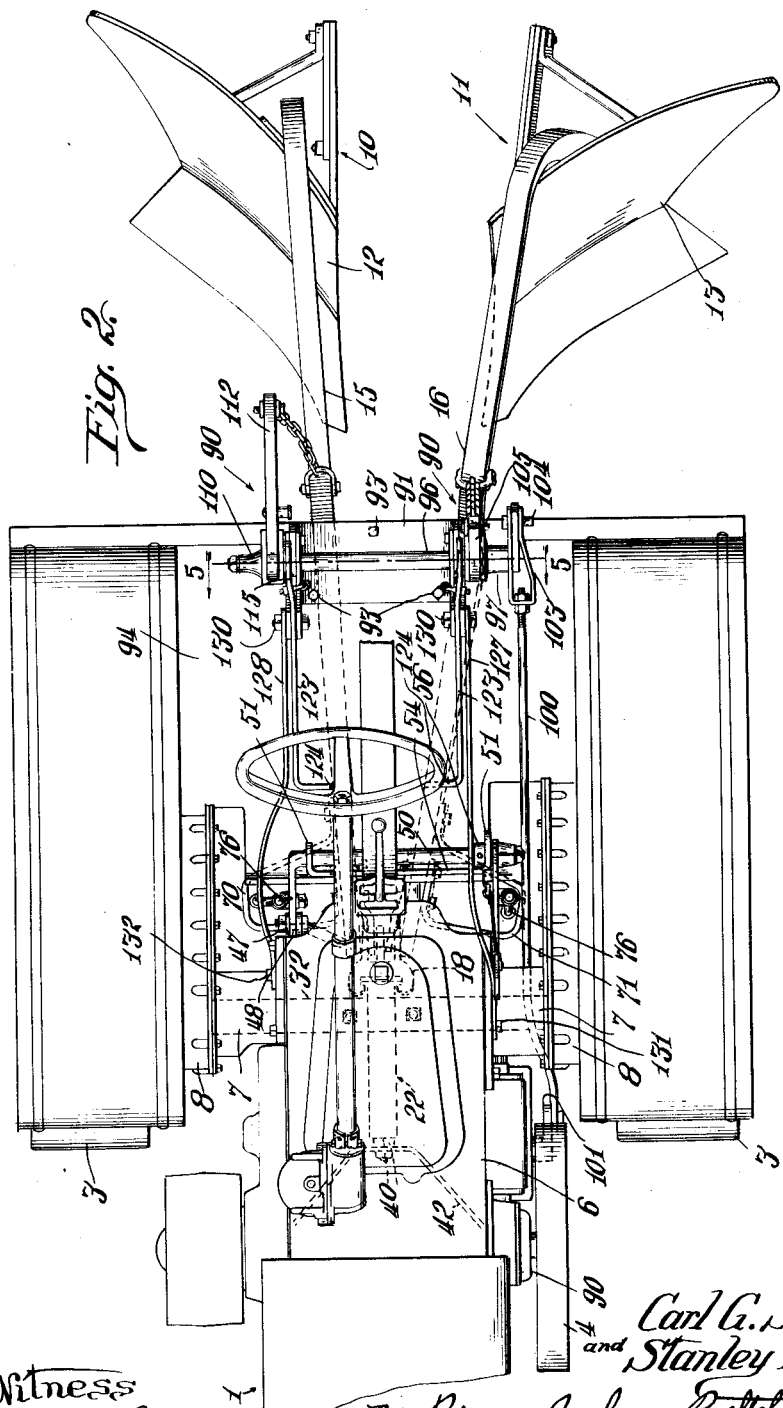

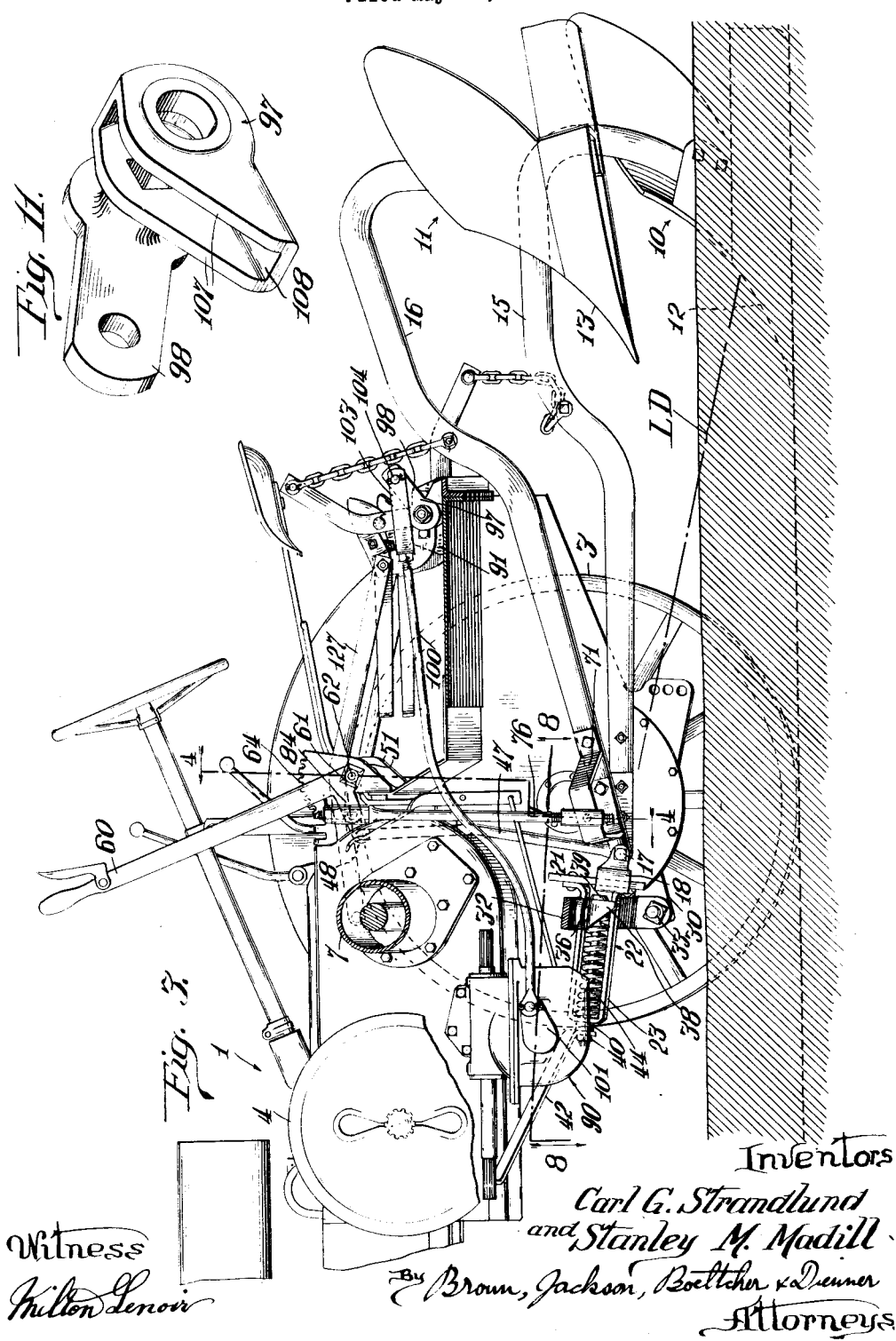

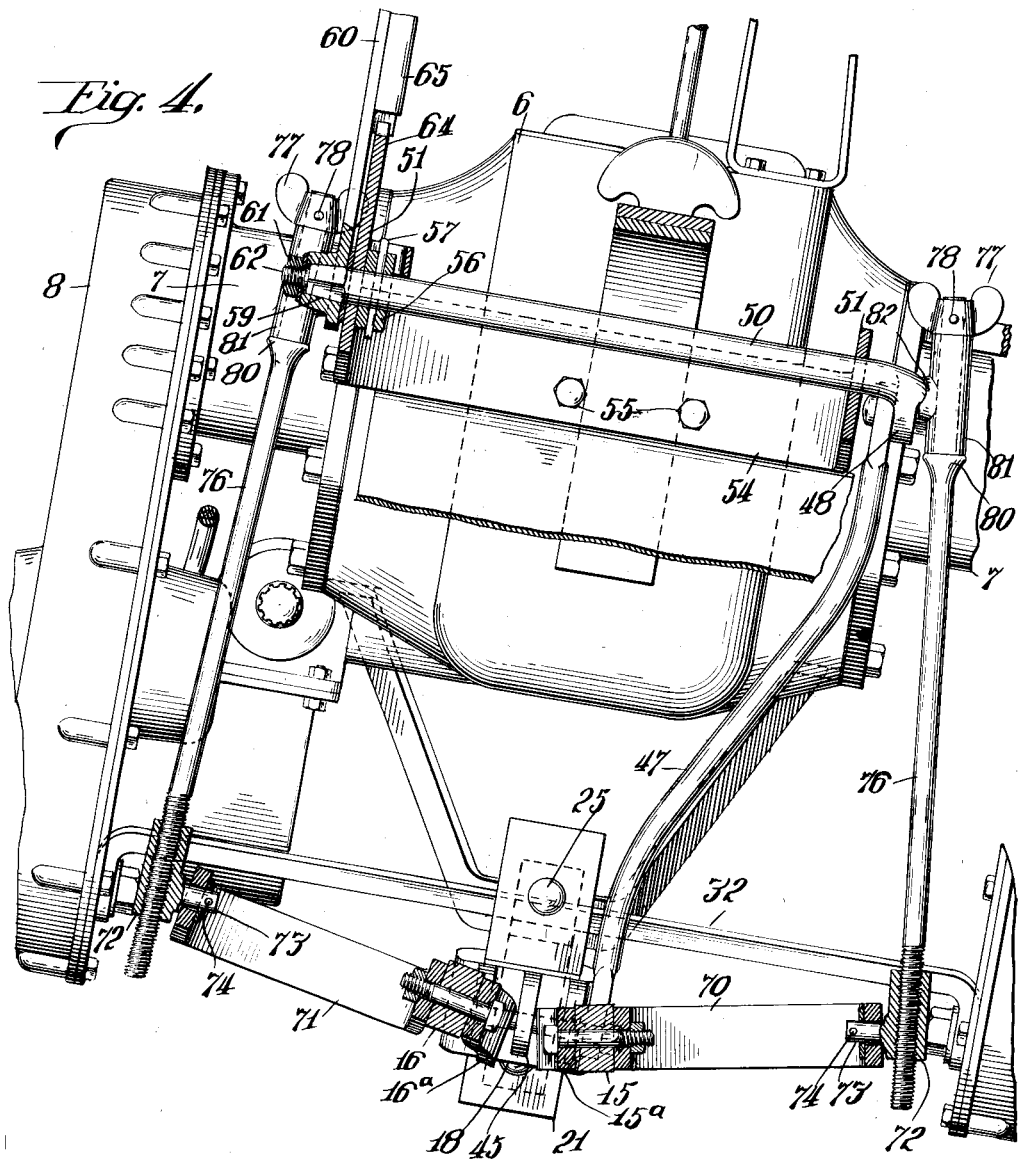

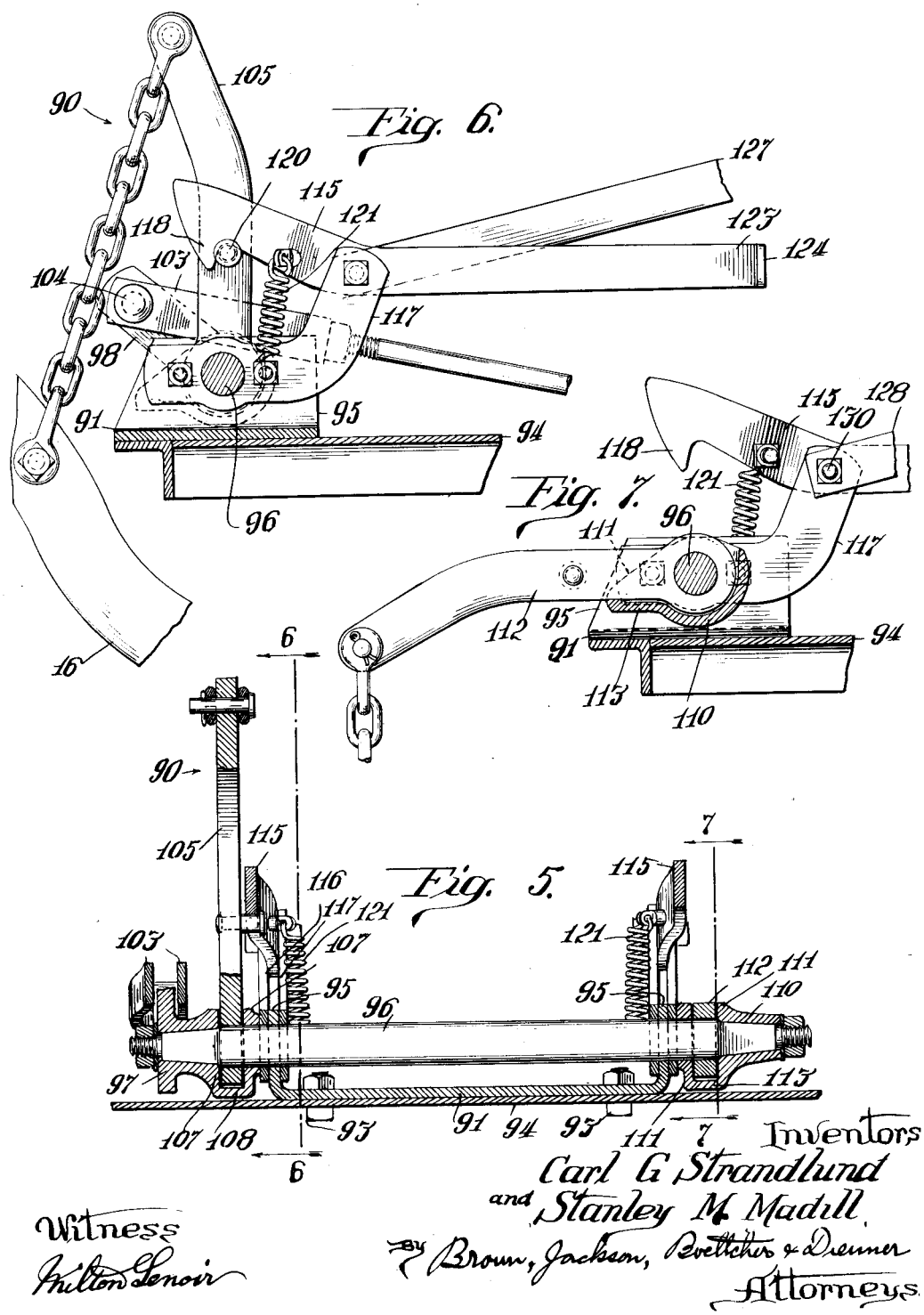

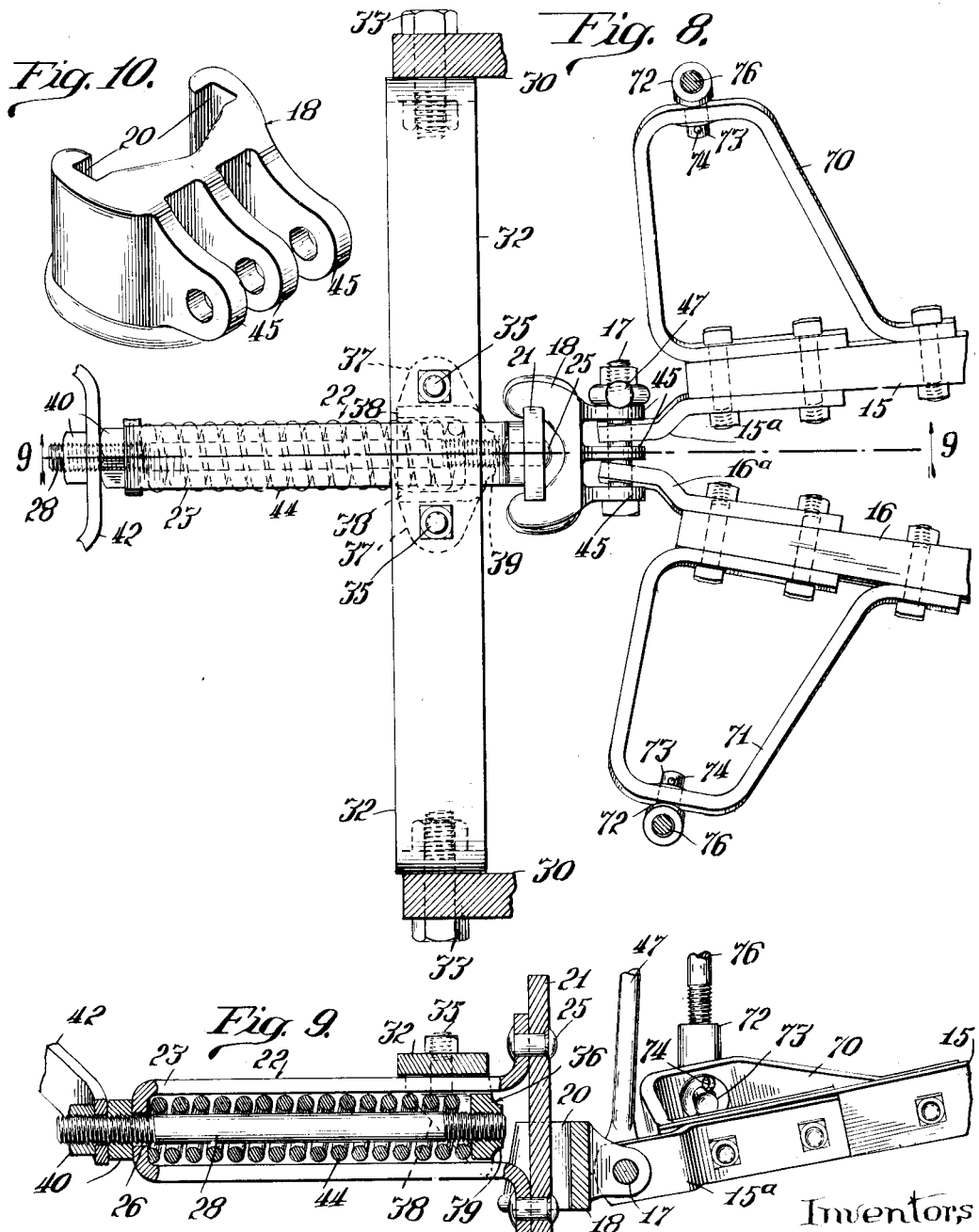

1,922,222

UNITED STATES PATENT OFFICE 1,922,222

PLOW

Carl G. Strandlund and Stanley M. Madill, Moline, Ill., assignors to Deere & Company, Moline, Ill., a Corporation of Illinois Application May 21, 1930. Serial No. 454,263

57 Claims. (Cl. 97—47)

Our invention relates generally to argricultural implements, and is particularly concerned with the provision of a plow or earth working implement adapted for attachment to a motor driven tractor and so constructed and arranged that when so attached the plow and tractor form a unitary power driven implement.

More specifically, our invention relates to what are known in the art as two-way plows, which is a type of plow comprising two plowing units arranged side by side, with their landsides next to each other so that they throw the furrow slice in opposite directions. These two units are arranged to be raised and lowered separately, and only one of them at a time is in operative position, the other being then raised and held in inoperative position. In using such a plow it is driven back and forth across the field, and each time the field is traversed the furrow slice is taken off the same end of the land.

Such plows have the important advantage that they keep the land in a level state and avoid dead furrows and land backs, or ridges caused by throwing the dirt from two furrows onto an unplowed strip. These plows have been in use for a number of years but have not proven entirely satisfactory because with most of the prior constructions it is practically impossible to keep the center of resistance of both plowing units when each is in operative position in a common line of draft. That is, when one gang of plowing units is in operative position the line of draft to that gang is somewhat to one side of the machine, and when the other gang of plowing units is in operative position, the first gang being then raised out of operative position, the line of draft shifts to the other side of the machine. The best results would be obtained if the line of draft were maintained constantly in a longitudinal vertical plane coincident with the center of power of a tractor or other drawing means. The principal object of our invention is, therefore, the provision of an improved construction of two-way plows and of an improved form of draft connecting means therefor whereby either gang of plowing units may swing into the common line of draft established by the tractor or other drawing means. Preferably, the plowing unit in operative position swings laterally into the line of draft and independently of the plowing unit on the other side of the machine which is retained in raised position.

Another object of our invention and one which is of considerable importance is the provision of means for adjusting the depth of plowing and leveling the plow unit automatically and at the same time. It is usual in plows where the plowing units are supported upon or by the tractor to have one traction wheel of the tractor run in the furrow made during the preceding round and to have the other traction wheel run on the land. This causes a lateral tipping of the tractor but it is nevertheless necessary to have the plow bodies level in order that the furrows may be uniform and the ground properly turned. It is obvious that the deeper in the ground the plows operate the more the tractor will be tipped laterally. Prior to our invention it was necessary to adjust the plows for depth and then by a separate and distinct operation adjust the plows for leveling the same. As stated above, one important object of our invention is a provision of automatically operating means for simultaneously adjusting the depth and leving the plows at the same time so that all the operator has to do is to adjust the depth adjusting lever for the proper depth, the plowing unit being automatically adjusted angularly with respect to the tractor so that when the furrow wheel of a tractor runs in the furrow the plowing units will run level.

Another object of our invention is the provision of a spring cushion hitch connection which is mounted on the tractor in such a manner that it is supported at two points longitudinally of the tractor which makes for a strong and sturdy connection between the plowing units and the draft means, but notwithstanding the dual support for the hitch connection the spring or resiliently yielding means is adapted to freely yield under an abnormal load so as to protect the tractor and plowing units from excessive overload. In addition, our novel spring cushion hitch connection is so arranged that it can be adjusted so as to practically exactly lie along the line of draft from the tractor to the plowing units, irrespective of which plowing unit is at the moment in operation.

Another object of our invention and one which is also of considerable importance is the provision of an improved construction of the plowing units themselves. This improved form of construction is such that the beams of the two units converge forwardly and connect to the tractor at approximately the point of convergence which thereby establishes a common point of draft. Since each plowing unit may swing independently of the other and into the line of draft, it is obvious that the line of draft does not shift with respect to the tractor when changing from one plowing unit in operative position to the other plowing unit, the first plowing unit being raised out of operative position as the other plowing unit is lowered into operative position.

Our invention also contemplates the provision of an improved form of lifting means mounted directly on the tractor for raising the plowing units alternately. Preferably, the lifting means is adapted to be actuated by the motor of the tractor, which may be accomplished by connecting the lifting means with the power lift connection mounted on the tractor.

A further object is to improve the construction and operation of two-way plows in various other respects which will be pointed out in the course of this specification. We accomplish these objects as hereinafter described and as illustrated in the accompanying drawings which show the form in which we prefer to embody our improvements. What we regard as new is set forth in the claims.

In the drawings:

Figure 1 is a perspective view showing the tractor and plowing units in operation, the right hand gang or plowing unit being positioned in operative position while the left hand gang or plowing unit is retained out of operative position;

Figure 2 is a plan view showing approximately the position taken by the right hand of plowing unit and it is in lowered or operative position, and part of the tractor being broken away;

Figure 3 is a vertical cross section showing the spring cushion hitch connection, the depth adjusting means and the lifting means for the plowing units, the left hand plowing unit being shown in raised position;

Figure 4 is a fragmentary enlarged view, taken substantially on the line 4—4 of Figure 3, certain parts being shown in section and others in elevation, and showing details of the automatic depth adjusting and leveling means;

Figure 5 is an enlarged fragmentary cross sectional view taken substantially along the line 5—5 of Figure 2;

Figure 6 is a cross sectional view taken along the line 6—6 of Figure 5 and showing details of the manually releasable means for holding the plowing units in raised position;

Figure 7 is a cross sectional view taken along the line 7—7 of Figure 5 and showing the position of the releasable means when the plowing unit is in lowered or operative position;

Figure 8 is an enlarged view taken substantially along the line 8—8 of Figure 3 and showing the hitch connection between the tractor and the plowing units;

Figure 9 is a cross sectional view taken along the line 9—9 of Figure 8;

Figure 10 is an enlarged perspective view of the hitch member or casting by which the forward ends of the plowing units are connected to the spring hitch connection; and Figure 11 is an enlarged perspective view showing a portion of the power lift mechanism.

Referring now to the drawings, the reference numeral 1 indicates the tractor in its entirety having front wheels 2 and rear wheels 3. The tractor includes the usual motor, the fly wheel of which is indicated by the reference numeral 4, and the usual gear and transmission members contained within the housing 6 which serves as a part of the frame of the tractor. The drive to the rear wheels 3 is transmitted from the transmission mechanism by means of the customary drive shaft enclosed within tubular extensions 7 secured to the housing 6 and to the other ends of which is secured chain drive housings 8. The housings 8 contain the sprocket and chain drive from the drive shaft to the drive wheels 3.

The plow comprises a pair of gangs or plowing units 10 and 11 carrying right hand and left hand plow bottoms 12 and 13, respectively.

Before proceeding further with a description of the construction shown, it should be explained that in such description the term "gang" will be employed as designating each plowing unit, whether such unit comprises a single beam with its attached furrow opener or plow bottom, such as is illustrated, or a plurality of beams and furrow openers rigidly connected together to move in unison.

The two gangs or plowing units 10 and 11 have forwardly extending plow beams 15 and 16 which converge forwardly and are pivotally connected to an attaching member which comprises a bolt 17 carried by a hitch member 18, as best shown in Figures 3 and 8. The hitch member 18 is channeled, as at 20, to have sliding engagement with the rear transverse hitch plate or vertical member 21 of the spring cushion hitch 22.

The spring cushion hitch 22 is seen to comprise a U-shaped bracket 23 having its ends riveted, as at 25, to the vertical member 21, as best shown in Figure 9, the forward and intermediate portion of the U-shaped bracket 23 is apertured at 26 to receive the forward end of a guide bolt 28 secured to the tractor.

The guide bolt 28 is fixedly secured at both ends to the tractor by means which will now be described. The chain drive housings 8 have lugs 30 extending in a vertical plane and to which is secured the draw bar 32, as by bolts 33. The draw bar 32 extends transversely underneath the tractor and centrally thereof. The draw bar 32 is apertured to receive the bolts 35 by which the casting 36 is secured to the draw bar 32. This casting comprises lugs 37, a pair of depending side portions 38 and an intermediate abutment portion 39, the latter being threaded to receive the rear end of the guide bolt 28, as best shown in Figure 9. The guide bolt 28 is also threaded at its forward end and is provided with a pair of nuts 40. The forward end of the guide bolt 28 is secured to the tractor by means of a V-shaped bracket 42, the intermediate portion of which is secured between the nuts 40 and the arms of which extend forwardly and laterally and are secured to the forward portion of the tractor on opposite sides, thus rigidly securing the guide member or bolt 28 to the tractor in fixed position.

A compression spring 44 embraces the guide bolt 28 and bears against the inner or intermediated portion of the bracket 23 and the front face of the abutment 39, as best shown in Figure 9. As will be clear from the above description, the draft effort is transmitted from the body of the tractor to the draft bar 32, casting 36 and then through the compression spring 44 to the forward end of the bracket 23, and from there through the vertical member 21 and the hitch member 18 to the forward ends of the gangs of plowing units. On an overload, the compression spring 44 yields, allowing the bracket 23 to slide rearwardly on the guide bolt 28, thus relieving the tractor and the plows of excessive stress.

As best shown in Figure 8, it will be seen that the hitch member 18 is formed to provide a plurality of rearwardly extending lugs or ears 45, these lugs being apertured to receive the hitch bolt 17 which connects the plows to the hitch member 18. In the embodiment of our invention illustrated the hitch member 18 is provided with three of such lugs which are spaced to allow each of the apertured plates 15a and 16a to be received between two of the lugs 45 and in such a manner that the plow beams 15 and 16 to which the plates 15a and 16a are respectively connected to have limited lateral swinging or movement in a horizontal plane relative to the hitch member 18.

From Figure 3 of the drawings it will be noted that the bracket 23 and the guide bolt 28 are inclined forwardly and upwardly at a slight angle so as to be positioned substantially coaxially with the line of draft which extends from the tractor to the center of resistance of the plowing unit in operative position, which line of draft is represented by the dotted line in Figure 3 designated by the letters LD. The angular position of the bracket 23 may be adjusted by means of the nuts 40 by backing off one and screwing up the other, or vice versa, to give the bracket 23 a greater or less degree of angular position so as to bring the bracket 23 substantially in line with the line of draft for the particular plowing depth for which the plowing units are adjusted. That is, by virtue of the guide bolt 28 being fixed at its rear end to the cross bar 32 on the tractor and at its forward end to the U-shaped bracket 42 at a point below the line extending from the cross bar 32 and the point of connection between the forward end of the bracket 42 and the tractor, rearward movement of the nuts 40 and the connecting end of the bracket 42 on the guide bolt 28, as seen in Figure 3, will tend to straighten the angle between the member 42 and the guide bolt 28, thus causing the forward end of this bolt 28 to move upwardly or in a clockwise direction as viewed in Figure 3. Conversely, forward movement of the nuts 40 and connecting end of the bracket 42 on the guide bolt 28 will tend to increase the angle between the member 42 and the guide bolt 28, hence causing the forward end of this bolt to move downwardly or in a counterclockwise direction as seen in Figure 3. This adjustment of the bolt 28 will, of course, cause the concurrent rotation of the draft bar 32 on the bolts 33 and will therefore swing the bracket 23 and the bolt 28 in alignment with or parallel with the line of draft between the front end of the plow beams and the center of resistance of the plows. While the front ends of the V-shaped bracket 42 are rigidly connected to the body of the tractor, as described above, there is sufficient spring or resiliency in the bracket itself to allow for this adjustment. While, generally speaking, the plow can be operated at a variable depth of, for example, from two to twelve inches, any fixed position of the bracket 23 would be only approximately in a direct line of draft except for one plowing position. As a rule, however, the depth of plowing is not varied any appreciable extent so that once the bracket 23 is set it occupies a position substantially in the line of draft from the tractor to the plows. In other words, one adjustment of the bracket 23 suffices for a limited range of different plowing depths, and if the operator wishes to plow relatively deep or relatively shallow for a considerable length of time, or during the whole season, he will make this adjustment to bring the bracket 23 into as near a direct line as possible with the plow set at the depth at which it will be usually operated.

As stated above, the hitch member 18 is slidable vertically along the plate member 21, and it is by this means that the depth of plowing is preferably controlled. Referring more particularly to Figures 3 and 4, it will be noted that a link 47 is secured to the hitch member 18, preferably by means of the bolt 17, the connection being such that some pivotal movement is permitted between the link 47 and the hitch member 18. The link 47 curves outwardly and then upwardly where it is formed to have pivotal connection at its upper end to the forward end of the arm 48 which is made integral with the rock shaft 50 and preferably formed at the right hand end of the rock shaft 50. The rock shaft 50 is journaled in openings in the rearwardly extending arms 51 formed on a bracket 54 bolted to the rear end of the tractor housing 6 by means of bolts 55. The rock shaft 50 is held in position between the arms 51 by means of a collar 56 held to the rock shaft 50 by a cotter pin 57, or any other suitable means.

The left hand end of the rock shaft 50 is square, as best shown in Figure 4, the squared end being also tapered as at 59, and a hand lever 60 is fixed at its lower end to the end 59, preferably by means of a nut 61 threaded onto the reduced threaded end 62 of the rock shaft 50. The left hand end 51 of the bracket 54 is formed with an upward extension 64 which is arcuate and notched to form a sector for the latch 65 of the lever 60. It will be noted that the lever 60 cooperates with the collar 56 to hold the rock shaft from lateral movement in the bracket 54. From the structure so far described it will be clear that rocking the lever 60 will rock the shaft 50 and hence raise and lower the link 47 which, in turn, slides the hitch member 18 up and down the plate 21 carried on the bracket 23 which is a part of the hitch connection. As is well understood in the art, lowering the front ends of the beams of the gangs serves to cause the plow bottom to run at a greater depth, and raising the front ends of the beams causes the plow bottoms to run more shallow. Thus the hand lever 60 may be actuated to adjust the vertical position of the hitch member 18 on the plate 21 and thus adjust the plowing depth of the gangs.

We will now describe the automatically operating means by which the plowing unit in operative position is leveled at the same time the unit is adjusted for the desired depth of plowing. A laterally extending bracket is bolted to the forward end of each of the beams 15 and 16, the bracket bolted to the beam 15 being designated by the reference numeral 70 and the bracket bolted to the beam 16 being designated by the reference numeral 71. The outer portion of each of these brackets 70 and 71 is perforated to pivotally support the threaded sleeve or nut member 72 which is provided with a bearing stud 73 secured in the perforation of the bracket by means of a pin or key 74, best shown in Figures 4 and 8. A link 76 is threaded at its lower end into the nut member 72, as shown in Figure 4, and the upper end of each link 76 is provided with a winged member 77 pinned thereto by means of a pin 78. Each of the links 76 is provided with a peripheral shoulder 80 and is rotatably received within a sleeve member 81, the sleeve member being confined between the winged member 77 and the shoulder 80, as shown in Figure 4. The right hand sleeve member 81 is journaled in a perforation in the arm 48, the sleeve member being provided for this purpose with a laterally extending stud 82, the perforation receiving the stud 82 being somewhat to the rear of the point of pivotal connection between the arm 48 and the link 47. The left hand sleeve member 81 is journaled in a forwardly extending arm 84 preferably formed integral with the lever 60 at its lower end, as indicated in Figure 3. The left hand sleeve member 81 is provided with a stud similar to the stud 82 formed on the right hand sleeve member 81. A pin may be passed through the inner ends of each of these studs to retain the sleeve members on the respective arms or the studs may be threaded to receive nuts thereon for the same purpose.

Thus by rocking the rock shaft 50 in one or the other direction through the operation of the lever 60, the hitch member 18 may be positioned in any desired vertical position along the plate 21 to vary the operating depth of the plowing units, and simultaneously with this vertical positioning of the member 18 carrying the front ends of the beams 15 and 16, the winging or angular position of the plowing units are controlled through the links 76.

Since the links 47 and 76 are connected at different distances from the axis of the rock shaft 50, the link 47 being connected at the greater distance from the axis, member 18 is moved to a greater extent than the nut member 72 when the rock shaft 50 is rocked a given amount in adjusting the depth of plowing. This operation is necessary because, as stated above, the tractor usually operates with either the left or the right hand wheels running in the furrow, depending upon which of the plow bottoms 10, 11 is being used. Thus the position of the furrowed wheels with respect to the undisturbed ground surface changes with every change in plowing depth, the plow tipping laterally to a greater extent when plowing deep than when plowing shallow, as will be readily understood. In order, therefore, to maintain the plow level in all operating positions it is necessary to proportion the movement of the outer end of the bracket 70 or 71 to the amount of movement of the hitch member 18, this proportion being equal to the distance from the nut member 72 to the drive wheel compared to the distance from the hitch member 18 to the drive wheel.

This proportion may be made more clear by considering that a given displacement of the hitch member 18 will occasion a corresponding increase in the depth of plowing. Consider that the hitch member 18 is lowered a distance equal to two inches, hence the plowing depth is increased by the same amount. On the next round, however, the furrowward wheels of the tractor run in the furrow of increased depth, hence the tractor is tilted an increased amount which lowers the hitch point where the plowing unit is attached to the tractor. Since this point is substantially midway between the wheels this point is lowered one-half the amount of increased depth of plowing, which is, in this case one inch. It is therefore evident that on this round and on all subsequent rounds the increase in plowing depth will be three inches. It was stated that the hitch member 18 was lowered a distance equal to two inches. Now if the laterally extending bracket and the nut member 72 were also lowered a distance equal to two inches the plow would not be level for the simple reason that the nut member 72 being nearer the forward drive wheel when the central point where the hitch connection is made the nut member would be moved downwardly relative to the ground surface a distance greater than three inches, the increase over three inches being proportional to the width of the bracket 70 or 71 as compared to the distance from the hitch member 18 to the rear wheel or, in other words, to one-half the tread of the rear wheels of the tractor. It is therefore necessary when lowering the hitch member 18 to increase the depth of plowing to lower the nut member a distance which is not equal to the distance which the hitch member 18 is lowered but a distance somewhat less than that. If, for example, the nut member 72 were in the plane of the rear wheel which runs in the furrow it would not be necessary to lower the nut member at all, but since the nut member is spaced inwardly a distance from the plane of the forward rear wheel it must be lowered a certain amount, this amount comparing with the distance to which the hitch member 18 is lowered as the distance which the nut member 72 is spaced from the plane of the rear wheel in the furrow compares with the distance between the center of the tractor where the hitch member 18 is attached to the plane of the rear wheel or, in other words, one-half the tread of the rear wheels of the tractor. This proportion we obtain by pivoting the links 76 and 47 at distances from the pivotal axis of the rock shaft 50 which equal, respectively, the proportion just indicated.

Independent angular adjustment for the individual plowing units may be made by turning the links 76 in the sleeve members 81 by means of the wings 77. In practice, however, these separate adjustments need rarely be resorted to, by reason of the fact that the lengths of the lever arm connections of the links 76 and 47 to the rock shaft 50 are so nicely proportioned with respect to the distance of the nut member 72 from the right hand wheel, as viewed in Figure 4, relative to the width of the tractor, that the plow is held substantially level at all operating depths.

While under normal operating conditions the plowing unit in operation is maintained level at all depth of plowing it is, nevertheless, true that when opening the land and before the right hand wheels of the tractor are riding in the bottom of the furrow the plowing unit is not quite level, the point of the plow bottom being lower than the remaining portion of the plow bottom or, conversely, the forward end of the plow share riding higher than the point of the share. This is, however, not undesirable and is, as a matter of fact, quite desirable because when opening up the land the furrow slice must be thrown up higher than ordinarily, it being necessary to place the same on top of the undisturbed ground and hence under extremely difficult conditions, this might be too great a load for efficient operating conditions. Therefore by having the plow bottoms tilted slightly the tendency toward overload under the conditions mentioned would be absent.

The plowing units are lifted out of operative position by means of a lifting mechanism mounted on the rear of the tractor platform and controlled from the power lift mechanism 90 on the tractor 1. A bracket 91 is bolted, as by bolts 93, to the platform 94 of the tractor 1 and is provided with two upturned portions 95 having bearing openings in which a rock shaft 96 is journaled. The rock shaft 96 has a casting 97 fixed to its left hand end, as best shown in Figure 5, and this casting is provided with an upwardly and rearwardly extending arm 98, best shown in Figures 3 and 11. A lifting rod or link 100 is connected at its forward end to the power lift crank arm 101 and at its rear end to the arm 98 by means of a U-shaped bracket 103 pivoted to the end of the arm 98 by means of a pivot pin 104.

A lifting arm 105 is journaled on the rock shaft 96 and is positioned between and embraced by two flanges 107 formed on the casting 97. The bottom edges of the flanges 107 are connected together by a bridging portion or abutment surface 108 upon which the rear edge of the lifting arm 105 rests when the beam 16 is in operative position.

A casting 110 similar to the casting 97 except that it has no lifting arm 98 is fixed to the right hand end of the rock shaft 96, both the casting 97 and the casting 110 having a squared tapered opening to receive the correspondingly formed end of the rock shaft 96 whereby both castings are nonrotatably secured to the rock shaft 96. A lifting arm 112 similar to the lifting arm 105 is journaled on the rock shaft 96 between the flanges 111 formed on the casting 110, which flanges are similarly connected by a portion 113, like the lower portion 108 of the casting 97. The lower edge of the lifting arm 112 likewise rests on the bridging portion 113 of the casting 110 when the beam 15 is in operative position as shown in Figure 5.

From Figures 6 and 7 it will be observed that rocking the shaft 96 in a clockwise direction as viewed in these figures either or both of the lifting arms 105 and 112 will be rocked upwardly, the abutment portions 108 or 113 contacting with the corresponding arm which is in its lowered position. Both of the lifting arms 105 and 112 are connected by means of a chain to the beams of the gangs or plowing units as indicated in Figures 1 and 6. Hence by rocking the shaft 96 by the power lift mechanism 90 of the tractor the plowing unit in lowered position will be raised, and if both of these units are in their lowered positions both will be raised. The mechanism for holding either or both of the plowing units in raised position comprises a latch member 115 for each of the lifting arms 105 and 112. Each of the latch members 115 is pivotally connected between two brackets 116 and 117 bolted to opposite sides of the upturned portions 95 of the bracket 91. Each latch member 115 is provided with a hook 118 at its rear end which is adapted to engage over a lug 120 riveted to each of the lifting arms 105 and 112. If desired, the lug 120 may have rollers mounted thereon for easy engagement by the hooks 118. The latch members 115 are normally held in locked position by means of springs 121 connected to the rear ends of the latch members 115 and to the brackets 117 as best shown in Figure 5. Each of the latch members 115 is provided with a forwardly extending portion 123 and has a pedal 124 at its forward end whereby the operator by stepping on either of the pedals 124 may release the lifting arm held in raised position thereby.

When the power lift mechanism 90 is operated, the rock shaft 96 is rocked forwardly to lift the arms 105 and 112 into the position shown in Figure 6 and the latches 115 ride up over the lugs 120 and hold the plowing units in raised position. After the power lift mechanism has been operated to lift the plows to raised position, it is next operated a second time to rotate the rock shaft 96 back to the position shown in Figures 6 and 7. With the rock shaft in this position, either of the plowing units may be dropped into working position without lowering the other plow by stepping on the pedal 124 and unlatching the corresponding member 115, as indicated above. In operation, first one plow is used and then the other, so that in each lifting operation only one of the plows, the one that has been in operation, is lifted, the other having been held up by the latch engaging the lug of the lifting arm on that side of the tractor.

The lifting mechanism is braced by means of two braces 127 and 128 which are connected at their rear ends to the brackets 116 by means of the bolts 130 which also act as the pivot means for supporting the latches 115. At their forward ends the braces 127 and 128 are bolted to the sides of the tractor as indicated by the reference numerals 131 and 132 in Figure 2.

While we have described in connection with the accompanying drawings one preferred embodiment of our invention it is to be understood that our invention is not to be limited to the specific structure shown and described but that, in fact, widely different means may be employed in the practice of the broader aspects of our invention.

What we claim, therefore, and desire to secure by Letters Patent is,

1. A two-way plow comprising two oppositely acting rearwardly divergent gangs movable alternately into operative position and arranged at opposite sides of a normal central line of draft, a centrally located draft member connected with said gangs and about which the gangs are adapted for independent horizontal swinging movement with respect to the line of advance under the force of draft when in operative position, and means for preventing appreciable lateral swinging movement of the gangs when in inoperative position.

2. A two-way plow comprising two oppositely acting rearwardly divergent gangs movable alternately into operative position and arranged adjacent to the normal central line of draft when in inoperative position, a centrally located draft member connected with said gangs and about which the gangs are adapted for individual pivotal movement in substantially horizontal and vertical planes, and means for holding either gang on said frame out of operative position comprising a vertically movable member for each of the gangs and a relatively short connection from each member to the associated gang, whereby lateral swinging of the gang in inoperative position is restricted.

3. A two-way plow comprising a wheeled frame, two oppositely acting rearwardly divergent gangs movable relative to the frame and to each other, said gangs being also movable alternately into and out of operative position and arranged substantially adjacent the normal central line of draft when in inoperative position but at opposite sides thereof, means for supporting either gang on the frame out of operative position and to limit lateral swinging thereof while in inoperative position, and an attaching member connecting the gangs to the wheeled frame so that either of said gangs may swing vertically and laterally with respect to changes in the line of advance under the force of the draft after either gang is lowered to operative position.

4. A two-way plow comprising a wheeled frame, two oppositely acting rearwardly divergent gangs movable relative to the frame and to each other, said gangs being also movable separately into and out of operative position, means for supporting either gang on the frame out of operative position for limited swinging movement and substantially adjacent the vertical plane of the normal line of draft but at opposite sides thereof, and an attaching member laterally rigid on said wheeled frame and connecting the gangs to the wheeled frame whereby the gangs may swing laterally with respect to the line of advance under the force of the draft after either gang is lowered to operative position.

5. An agricultural implement comprising a wheel supported frame, two oppositely acting plow bottoms, means connecting the plow bottoms to the frame at a forwardly converging angle to each other while permitting them to move separately into and out of operative position, said means including a vertically adjustable attaching member resiliently connected with the frame and to which the plow bottoms are pivotally connected to permit either plow bottom to swing in horizontal and vertical planes with respect to the line of advance independently of the other plow bottom, under the force of the forward draft, when the one plow bottom is lowered to operative position.

6. An agricultural implement comprising a wheel supported frame, two oppositely acting plow bottoms, a plurality of means for supporting the plow bottoms on the frame at a forwardly converging variable angle to each other and substantially immediately adjacent the normal central line of draft when in inoperative position, said means holding the plow bottom in inoperative position against appreciable movement in that position, one of said means including an attaching member connected with the frame and to which the plow bottoms are pivotally connected to permit either plow bottom to swing immediately laterally to a position behind the frame into the normal central line of draft under the force of the forward draft when it is lowered to operative position, without disturbing the angularity of the other plow bottom.

7. A two-way plow comprising a wheeled frame, two oppositely acting rearwardly divergent gangs, means connecting the forward ends of each gang to the frame for limited vertical and horizontal movements relative to the frame and whereby each gang may swing both vertically and laterally independently of the other gang, means for tilting said gangs relative to the aforesaid means about substantially longitudinal axes, and means on the frame for alternately raising and lowering one gang without moving the other.

8. A two-way plow comprising the combination with a tractor of a pair of forwardly converging gangs, and an adjustable attaching member resiliently connected with the tractor for connecting the gangs directly to the tractor for limited endwise movement relative thereto and for individual pivotal movement in horizontal planes as well as in vertical planes.

9. A two-way plow comprising the combination with a tractor of a pair of forwardly converging gangs, an attaching member for connecting the gangs to the tractor for individual pivotal movement in horizontal planes and vertical planes, each of said gangs including a beam extending substantially to the point of convergence, and said attaching member being slidably connected to the tractor at a point substantially midway thereof.

10. A two-way plow comprising the combination with a tractor of a pair of forwardly converging gangs, and an attaching member secured to a central point on the tractor and comprising a common hitch member for connecting the gangs to the tractor for individual pivotal movement in a horizontal plane but restraining lateral movement of the forward ends of the gangs, said hitch member adapted for vertical movement to adjust the operating depth of said gangs.

11. A two-way plow comprising the combination with a tractor having a transverse draw bar, of a pair of rearwardly diverging gangs, said gangs being independently movable, and means connecting the forward ends of the gangs to the tractor, comprising a vertically movable hitch member pivoted to both gangs and connected to the draw bar of the tractor.

12. A two-way plow comprising the combination with a tractor of a pair of forwardly converging gangs, an attaching member for connecting the gangs to the tractor, and means connecting the attaching member to the tractor at two spaced points thereon.

13. A two-way plow comprising the combination with a tractor of a pair of forwardly converging plow beams having plow bottoms, and means connecting the forward ends of the beams to the tractor substantially at the point of their forward convergence, said means comprising a hitch member pivoted to the ends of the beams and means connecting the hitch member with the tractor at a plurality of fore and aft spaced points thereon.

14. A two-way plow comprising the combination with a tractor of a pair of forwardly converging plow beams having plow bottoms, and means connecting the forward ends of the beams to the tractor substantially at the point of their forward convergence, said means comprising a hitch member pivoted to the ends of the beams and a spring cushion connection securing the hitch member to the tractor.

15. A two-way plow comprising the combination with a tractor of a pair of forwardly converging plow beams having plow bottoms, and means connecting the forward ends of the beams to the tractor substantially at the point of their forward convergence, said means comprising a hitch member pivoted to the ends of the beams, a fore and aft extending member, and adjustable bracket means for connecting the last named member to the tractor and aligning the same with the line of draft.

16. An agricultural implement comprising, in combination, a tractor, a plow having a forwardly extending plow beam, a spring cushion hitch connection connecting the beam to the tractor and comprising a guide member fixedly secured to the tractor, a spring encircling the guide member, an abutment at the rear end of the guide member against which the spring is adapted to abut, and means connecting the forward end of the spring to the plow beam to transmit draft thereto.

17. An agricultural implement comprising, in combination, a tractor having a draw bar, furrow opening means, a fore and aft yielding draft connection, means pivotally connecting the forward portion of the furrow opening means to the draft connection, means connecting the rear end of the draft connection to the draw bar of the tractor, and means comprising a brace having laterally and forwardly extending arms for connecting the other end of the draft connection to the tractor.

18. An agricultural implement comprising, in combination, a tractor, a plow having a forwardly extending plow beam, a spring cushion hitch connection connecting the beam to the tractor and comprising a guide member fixedly secured to the tractor, a spring encircling the guide member, an abutment at the rear end of the guide member against which the spring is adapted to abut, means connecting the forward end of the spring to the plow beam to transmit draft thereto, and means to adjust the angular position of the guide member to bring it into coincidence with the line of draft.

19. An agricultural implement comprising, in combination, a tractor, a plow having a forwardly extending plow beam, a hitch member pivoted to the forward end of the beam, a fore and aft extending U-shaped bracket connected with the hitch member, means forming an abutment secured to the tractor and slidable within the bracket, a guide member secured to the abutment at one end and extending forwardly through an aperture in the forward portion of the bracket and slidable therein, a spring tensioned between the forward portion of the bracket and the abutment, and brace means fixed to the forward end of the guide member and secured to the forward portion of the tractor.

20. An agricultural implement comprising the combination, with a tractor, of a plurality of plow beams having plow bottoms, draft means connected to the tractor and including a transverse hitch plate and a hitch member having portions embracing the plate and slidable thereon, and means pivotally connecting the hitch member to the plow beams.

21. An agricultural implement comprising the combination with a tractor, of furrow opening means connected with the tractor, a part of the tractor being adapted to run in a furrow, means on the tractor to adjust the operating depth of the furrow opening means, and simultaneously operating means acting in conjunction with the depth adjusting to level the furrow opening means.

22. An agricultural implement comprising the combination with a tractor, of furrow opening means connected with the tractor, a part of the tractor being adapted to run in a furrow, means on the tractor to adjust the operating depth of the furrow opening means, by tilting the same in a fore and aft direction, and concurrently operating means acting in conjunction with the depth adjusting to level the furrow opening means by tilting the same in a lateral direction an amount proportional to the depth adjustment.

23. An agricultural implement comprising the combination with a tractor, of furrow opening means connected with the tractor, a part of the tractor being adapted to run in a furrow, means on the tractor to adjust the operating depth of the furrow opening means, and means responsive to the depth adjusting means for concurrently leveling the furrow opening means.

24. In a plow, in combination, a wheel frame, a plow beam, a draft connection therefor comprising a vertical member, a hitch connection connected with the plow beam and slidably embracing said member, a lever mounted on the frame, connections from the lever to said hitch connection to adjust its vertical position on said member, and means actuated by the lever to adjust the angular position of the plow beam relative to the hitch connection.

25. In a plow, in combination, a wheeled frame adapted to run partially in a furrow, furrow opening means, a draft connection between said means and frame, and means to simultaneously level the furrow opening means and adjust the operating depth thereof.

26. In a plow, in combination, a wheeled frame, a plow beam, a draft connection therefor comprising a vertical member, a hitch connection connected with the plow beam and slidably embracing said member, a lever mounted on the frame, connections from the lever to said hitch connection to adjust its vertical position on said member, a laterally extending bracket mounted on the beam, and means connecting the bracket and lever so that as the lever is rocked to adjust the vertical position of the beam on the vertical member to vary the operating depth the beam is rocked laterally on the hitch connection to level the beam.

27. In a plow, in combination, a wheeled frame adapted to run partially in a furrow, a plow beam having a plow bottom, draft connections between the frame and forward end of the plow beam, said beam including a part movable vertically relatively to the connections and said beam being angularly movable relatively to said part, and leveling and depth adjusting means for the beam including a lever, an arm movable with the lever, a link connected to the arm and said part whereby swinging of the arm moves said part vertically, and means secured to the beam and to said arm at a point spaced from the point of connection of said link on the arm for leveling the beam as the lever is actuated to adjust its operating depth.

28. In a plow, in combination, a wheeled frame adapted to run partially in a furrow, a pair of plow beams having plow bottoms, connections between the beams and the frame permitting the beams to be vertically and angularly adjusted, a laterally extending bracket on each beam, a rock shaft journaled on the frame and having arms thereon, links pivotally connecting the arms to the brackets to angularly adjust the beams, a link extending from one of the arms to the beams and arranged to adjust the vertical position of the beams simultaneously with their angular adjustment, and means to rock the rock shaft.

29. In a plow having a wheeled frame, one side of which is adapted to run in a furrow opened on the previous round, a plow beam and plow bottom, the combination of means for automatically adjusting the depth of plowing and maintaining the plow bottom level comprising a rock shaft on the frame, a lateral extension on the beam, means pivotally connecting the rock shaft to the beam to raise and lower the same and means connecting the rock shaft to the extension to angle the beam laterally, the points of connection of said two last mentioned means being spaced from the pivotal axis of the rock shaft distances respectively proportional to one half the tread of said wheeled frame and the difference between one half the tread of the wheeled frame and the length of said lateral extension.

30. In a plow, a frame, plow beams pivoted to said frame to swing vertically to and from operating position, a rock shaft journaled on the frame, arm journaled on the rock shaft and connected with said beams to lift the same, abutments on said arms, brackets on the frame forward of the arms, and manually releasable means pivoted to the brackets and formed to engage the abutments to retain said plow beams in raised position.

31. A plow comprising the combination with a tractor having a motor, of plow beams pivoted to the tractor to swing vertically to and from operating position, a rock shaft journaled on the tractor, arms journaled on the rock shaft and connected with said beams to lift the same, a member fixed near each end of the rock shaft and including a projection adapted to engage each of said arms to swing the same upwardly when the shaft is rotated, fore and aft swinging power connections adapted to be actuated by the motor to turn the shaft, and means to hold the arms in raised position when they are elevated by the rock shaft.

32. An agricultural implement comprising the combination with a tractor having a motor of oppositely acting rearwardly divergent gangs, means connecting the gangs with the tractor so that each gang may have independent universal movement relative to the tractor, means for alternately raising and lowering one gang relative to the other, means to adjust the vertical position of the forward ends of the gang in operative position and its angular position to simultaneously level said gang and adjust its operating depth, said gang adapted to swing, under the force of the forward draft, to a position behind the tractor independently of the other gang, means adapted to be actuated by the motor for raising either gang, said means including a transverse rock shaft and arms journaled thereon and connected with each gang, releasable means for holding either of said gangs in its elevated position, said means having a member adapted to releasably engage each of said arms, and fore and aft extending means secured to the tractor at its forward and rearward portions and including a yielding member for connecting the gangs to the tractor in draft transmitting relationship.

33. A two-way plow comprising a frame, two oppositely acting gangs having forwardly converging beams movable alternately into operative position and arranged at opposite sides of a normal central line of draft, and a centrally located draft member supported on said frame for limited vertical and longitudinal movement relative thereto and connected with the forward ends of said beams and about which the beams are adapted for independent swinging in horizontal planes and vertical planes.

34. A two-way plow comprising a wheeled frame, two oppositely acting rearwardly divergent gangs movable alternately into operative position and arranged at opposite sides of a normal central line of draft, a lifting member connected with each gang, a centrally located draft member connected with said gangs and about which the gangs are adapted for individual pivotal movements in substantially horizontal and vertical planes, and separate means for directly engaging each lifting member respectively and for locking either gang on said frame out of operative position.

35. A two-way plow comprising a frame, oppositely acting plow bottoms having forwardly converging beams movable alternately into operative position and arranged at opposite sides of a normal central line of draft, and a centrally located draft member adjustably supported on said frame and having limited longitudinal movement relative thereto, said member being connected with the forward ends of said beams and about which the beams are adapted to assume positions in a plurality of horizontal planes and vertical planes, certain of said positions disposing the plow bottoms below the wheel supporting ground surface for opening up the first furrow.

36. A two-way plow comprising a wheeled frame, two oppositely acting gangs having forwardly converging beams disposed substantially immediately adjacent the normal central line of draft when in inoperative position, the forward ends of each beam being directly connected at substantially a common point on the frame so that each gang may swing both vertically and laterally independently of the other gang, and fore and aft swingable means on the frame for alternately raising and lowering one gang without moving the other gang.

37. A two-way plow comprising the combination with a tractor of a pair of forwardly converging gangs, an attaching member for connecting the gangs to the tractor, and means connecting the attaching member to the tractor at two fore and aft spaced points thereon.

38. A two-way plow comprising the combination with a tractor of a pair of oppositely acting gangs, and means supporting the gangs from the tractor for free lateral swinging, said means comprising an attaching member for the gangs secured to the tractor intermediate the ends thereof and upon which said gangs are axially adjustable, and raising and lowering means for the gangs secured near the end of the tractor.

39. A two-way plow comprising the combination with a tractor of a pair of forwardly converging gangs, an attaching member for connecting the gangs to the tractor, and means connecting the attaching member to the tractor comprising an element slidably engaging the attaching member and arranged to transmit the forward draft thereto.

40. An agricultural implement comprising, in combination, a tractor, a plow having a forwardly extending plow beam, a hitch member pivoted to the forward end of the beam, a fore and aft extending U-shaped bracket connected with the hitch member to transmit draft thereto, and resilient means connecting the bracket to the tractor.

41. In a plow, the combination with a tractor, of furrow opening means, fore and aft extending connections therefor, means slidably securing said connections to the furrow opening means whereby the depth of plowing may be adjusted, and means for adjustably mounting the connections on the tractor to permit the connections to be aligned with the line of draft when the furrow opening means is in operative position.

42. An agricultural implement comprising, in combination, a tractor, a plow having a forwardly extending plow beam, a hitch member pivoted to the forward end of the beam, a fore and aft extending U-shaped bracket connected with the hitch member for transmitting draft thereto, means to connect the hitch member to the bracket and at a number of positions thereon to vary the depth of plowing, and resilient means connecting the bracket to the tractor.

43. An agricultural implement comprising the combination with a tractor, of a plurality of plow beams having plow bottoms, draft means connected to the tractor and including a transverse hitch plate and a hitch member having a plurality of spaced apart rearwardly extending apertured draft lugs and forwardly extending portions embracing the plate and slidable thereon, and means pivotally connecting the hitch plate to the plow beams comprising a pin extending through the apertures in the lugs and corresponding apertures in the forward ends of the plow beams.

44. In a plow, in combination, a wheeled frame, a plow beam, a draft connection between the beam and frame, said beam being movable vertically relative to the draft connection, means on the frame to vertically adjust the beam to vary the depth of plowing, and means on the frame connected with the first named means to level the beam laterally.

45. In a plow, in combination, a wheeled frame, a plow beam, a draft connection between the beam and frame, said beam being movable vertically and angularly relatively to the draft connection, and manually operable means to simultaneously vary the vertical and angular positions of the beam.

46. A two-way plow comprising the combination with a tractor of a pair of oppositely acting plow bottoms having forwardly converging plow beams, hitch connections including parts permitting the beams to be vertically and angularly adjusted, a laterally extending bracket on each beam, said brackets secured near the forward converged ends of the beams and extending laterally and outwardly therefrom, a nut member pivotally secured to each bracket, a rock shaft journaled on the frame and having arms thereon, links pivotally connecting the arms to the brackets to angularly adjust the beams, said links being threaded into the nut members on the brackets and rotatably secured to the arms of the rock shaft, means pivotally connecting the arms with the forward ends of the beams so that when the arms are rocked the vertical position of the beams is adjusted simultaneously with their angular adjustment, the pivotal connection of the last mentioned means being so arranged relative to the axis of the rock shaft and the pivotal connection of said links on the arms that the plow bottom in operative position is automatically maintained level regardless of the depth of plowing and the tilting of the tractor due to partially running in the furrow.

47. In a plow, a frame, plow beams pivoted to said frame to swing vertically to and from operating position, a rock shaft journaled on the frame, arms journaled on the rock shaft and connected with said beams to lift the same, means secured on the shaft and adapted to embrace the arms to rock them in one direction to lift the beams and permitting the arms to rotate relatively to the shaft in one direction, abutments on said arms, brackets on the frame forward of the arms, and manually releasable means pivoted to the brackets and formed to engage the abutments to retain said plow beams in raised position.

48. In a tractor propelled plow, a frame, a power take-off mechanism including a crank on said tractor, plow beams pivoted to said frame to swing vertically to and from operating position, a rock shaft journaled on the frame, arms journaled on the rock shaft and connected with said beams to lift the same, means secured on the shaft and adapted to embrace the arms to rock them in one direction to lift the beams and permitting the arms to rotate relatively to the shaft in one direction, said means including a lever, and means connecting said lever to said crank whereby operation of said power take-off mechanism will actuate said rock shaft to raise said plow beams.

49. A two-way plow comprising the combination with a tractor of a pair of gangs having forwardly extending beams, a transverse draw bar carried by the tractor and pivotally connected therewith at two laterally spaced points, resilient attaching means connecting the forward ends of said beams with said draw bar for generally vertical movement relative to said draw bar, and means for raising and lowering the forward ends of the beams relative to the tractor.

50. A two-way plow comprising the combination with a tractor of a pair of generally forwardly extending plow beams having plow bottoms capable of movement in a generally vertical direction, a generally transverse draw bar carried by the tractor, hitch means pivoted to the ends of the beams and spring connected with said draw bar, and means for raising and lowering the forward ends of the beams relative to the tractor.

51. A two-way plow comprising the combination with a tractor of a pair of generally forwardly extending plow beams having plow bottoms capable of movement in a generally vertical direction, means acting as a transverse draw bar connected with the tractor, hitch means pivotally connected with the forward ends of said beams, means resiliently connecting said hitch means with said draw bar, and means for raising and lowering the forward ends of the beams relative to the tractor.

52. In a plow, a frame, plow beams pivoted to said frame to swing vertically to and from operating position, arms journaled on the frame and connected with said beams to lift the same, abutments on said arms, brackets on the frame forward of the arms, and manually releasable means pivoted to the brackets and adapted to engage the abutments to retain said plow beams in raised position.

53. A plow comprising the combination with a tractor having a motor, of plow beams pivoted to the tractor to swing vertically to and from operating position, a rock shaft journaled on the tractor, swingable arms connected with said beams to lift the same, a member fixed near each end of the rock shaft adapted to engage each of said arms to swing the same upwardly when the shaft is rotated, fore and aft swinging power connections adapted to be actuated by the motor to turn the shaft, and means to hold the arms in raised position when they are elevated by the rock shaft.

54. A plow comprising the combination with a tractor having a motor, of plow beams pivoted to the tractor to swing vertically to and from operating position, a rock shaft journaled on the tractor, movably mounted arms connected with said beams to raise the same, lost motion connecting means disposed between the rock shaft and said arms whereby the latter may be raised when the shaft is rotated, fore and aft swinging power connections adapted to be actuated by the motor to turn the shaft, and means to hold the arms in raised position when they are elevated by the rock shaft.

55. In a plow, a frame, plow beams pivoted to said frame to swing vertically to and from operating position, a rock shaft journaled on the frame, movably mounted arms connected with said beams to lift the same, interengaging means on the shaft and arms and operative by rotation of the shaft to rock the arms in one direction to lift the beams, abutments on said arms, brackets on the frame, and manually releasable means pivoted to the brackets and formed to engage the abutments to retain said plow beams in raised position.

56. A two-way plow comprising a wheel supported frame, two oppositely acting forwardly converging gangs connected with said frame and movable alternately into operative position, a single draft connection located substantially at the point of convergence of said gangs and adapted to permit said gangs to swing freely and independently laterally with respect to the line of advance under the force of the draft when in plowing position, and means for maintaining said gangs in separated relation.

57. A two-way plow comprising two oppositely acting gangs movable alternately into plowing position, each of said gangs having free lateral swinging movement to either side of said plow when in operative plowing position, and means for preventing such free lateral swinging movement of each gang after it is raised to inoperative position.

CARL G. STRANDLUND.
STANLEY M. MADILL.